United States Patent
Srinivasan (10) Patent No.: US 10,877,600 B2
(45) Date of Patent: Dec. 29, 2020

(54) SYSTEMS AND METHODS FOR DETECTING PROBLEMS INPUTTING TEXT WITH A TOUCH ENVIRONMENT AND PROVIDING SOLUTIONS

(71) Applicant: Rovi Guides, Inc., San Jose, CA (US)

(72) Inventor: Madhusudhan Srinivasan, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/141,307

(22) Filed: Sep. 25, 2018

(65) Prior Publication Data

US 2020/0097123 A1 Mar. 26, 2020

(51) Int. Cl.
*G06F 3/041* (2006.01)
*G06F 3/0488* (2013.01)

(52) U.S. Cl.
CPC ........ *G06F 3/0418* (2013.01); *G06F 3/04886* (2013.01)

(58) Field of Classification Search
CPC ............................ G06F 3/0418; G06F 3/04886
See application file for complete search history.

(56) References Cited

U.S. PATENT DOCUMENTS

| | | | |
|---|---|---|---|
| 8,164,582 B2 | 4/2012 | North | |
| 9,164,620 B2 | 10/2015 | Hotelling | |
| 9,448,724 B2 | 9/2016 | Arnold | |
| 2007/0126706 A1 | 6/2007 | Ziegler | |
| 2010/0079310 A1* | 4/2010 | Nachman | G06F 3/0233 341/23 |
| 2015/0309997 A1* | 10/2015 | Lee | G06F 1/1626 704/3 |
| 2016/0217681 A1 | 7/2016 | Guo | |
| 2016/0378289 A1* | 12/2016 | Chakra | G06F 3/0416 715/763 |

* cited by examiner

*Primary Examiner* — Stephen G Sherman
(74) *Attorney, Agent, or Firm* — Haley Guiliano LLP (57) ABSTRACT

The system manages a keyboard displayed on a touchscreen to address non-responsive regions of the touchscreen. The system monitors usage behavior of the displayed keyboard on the touchscreen. The system determines the non-responsive region of the touchscreen based on the usage behavior. For example, the non-responsive region may result from damage caused by dropping. The system modifies the displayed keyboard to avoid the non-responsive region of the touchscreen. For example, the system may change the location, size, orientation, and/or layout of the keyboard, or keyboard characters thereof, to avoid the non-responsive region.

14 Claims, 7 Drawing Sheets

ORIGINAL DISPLAYED KEYBOARD

MODIFIED DISPLAYED KEYBOARD

SYSTEMS AND METHODS FOR DETECTING PROBLEMS INPUTTING TEXT WITH A TOUCH ENVIRONMENT AND PROVIDING SOLUTIONS

BACKGROUND

The present disclosure relates to devices having touchscreens, and, more particularly, devices that provide a displayed keyboard on the touchscreen.

SUMMARY

Many mobile user devices such as mobile phones include touchscreens. Touchscreens can become damaged by excessive pressure or stress, which might result from an impact caused by dropping, for example, and become less responsive to user input. For example, a cracked touchscreen might not detect pressure from a touch due to a damaged panel or might not display images correctly and consequently, a user may have trouble providing haptic input to the damaged area. Typically, only a portion of the touchscreen is damaged. In such circumstances, it would be advantageous to modify the display (e.g., an onscreen keyboard) to avoid the damaged portion.

The present disclosure describes systems and methods for modifying a presentation of a displayed keyboard on a touchscreen. Said systems and methods monitor touchscreen usage for indications of damage, determine a region of the damage, and modify the displayed keyboard to avoid the region.

The displayed keyboard is initially presented on the touchscreen with illustrative display properties including, for example, size, shape, position, orientation, and keyboard character arrangement. Usage behavior includes haptic interaction to the keyboard from a user, and any processed content that arises from that haptic interaction. To illustrate, usage behavior includes keystrokes, patterns of keystrokes, and typed words. The system is configured to recognize aspects of the usage behavior that indicate a non-responsive region of the touchscreen. For example, under-utilized keyboard characters, unutilized keyboard characters, misspelled words, and a repeated use of a delete key may provide an indication of damage. In a further example, the system may provide a selectable indicator such as a button on the screen that, when selected, provides an indication that there is damage.

In addition to determining that the touchscreen is damaged, the system determines where the touchscreen is damaged or non-responsive. For example, the system might recognize that a particular keyboard character is never used and accordingly determines that the region of the touchscreen that corresponds to the particular keyboard character is non-responsive. In a further example, the system might recognize that a user selection of a keyboard character, or spatially-grouped set of keyboard characters are typically followed by the delete or backspace key. Accordingly, the system determines that the region of the touchscreen that corresponds to the keyboard character or set of keyboard characters is non-responsive. In a further example, the system might recognize that text arises from keyboard usage exhibits a common misspelling such as a character switch or a missing character. Accordingly, the system determines that the region of the touchscreen that corresponds to the missing or switched characters is non-responsive. In some circumstances, a damaged region of a touchscreen is only partially damaged and provides an incorrect, inconsistent, or intermittent response. The system may still determine that partially damaged regions are non-responsive. In some embodiments, the system prompts the user to define or indicate the non-responsive region by providing haptic input or other input.

The system is configured to modify the displayed keyboard to avoid the non-responsive-region. The system modifies one or more illustrative display properties of the displayed keyboard such as size, shape, position, orientation, and keyboard character arrangement. The system modifies the displayed keyboard, or keyboard characters thereof, to be displayed in a region that does not overlap with the non-responsive region. For example, the system may rotate the displayed keyboard to avoid the non-responsive region, shrink the displayed keyboard to avoid the non-responsive region, or may move one or more keyboard characters out of the non-responsive region to a responsive region while leaving other keyboard characters where they are.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
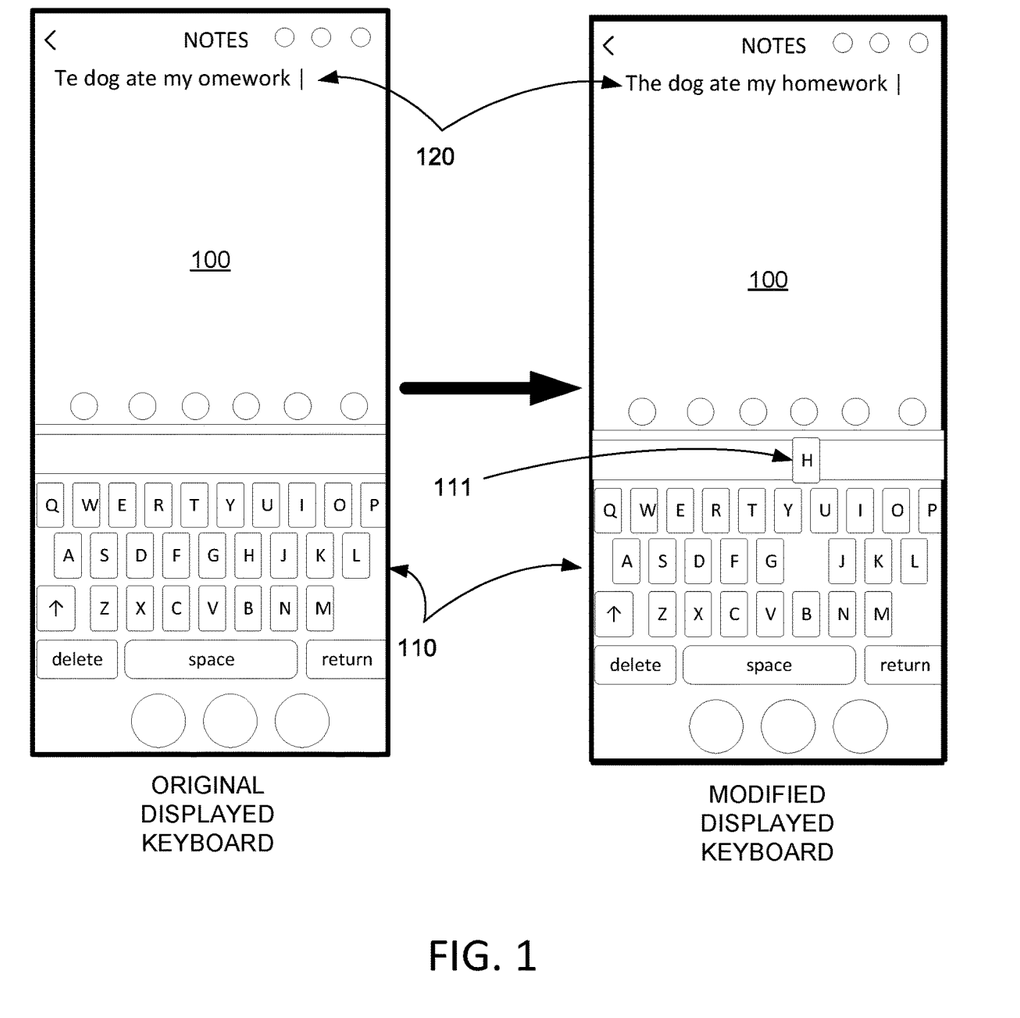
FIG. 1 shows an illustrative touchscreen before and after modification of a displayed keyboard, in accordance with some embodiments of the present disclosure.

FIG. 1 shows illustrative touchscreen 100 before and after modification of displayed keyboard 110, in accordance with some embodiments of the present disclosure. Touchscreen 100 is part of a user device, for example, and displays keyboard 110. In this illustrative example, touchscreen 100 also displays a text entry application (e.g., for taking notes), which may accept input from keyboard 110 (e.g., via haptic interaction by a user). The original displayed keyboard 110 is displayed on touchscreen 100 such that the keyboard character "H" corresponds to a damaged region. Accordingly, the user device does not recognize haptic input to the damaged region, and typed text 120 includes misspelled words. For example, the intended text "The dog ate my homework" is recognized as "Te dog ate my omework" as a result of the damaged region. In response to determining that the "H" key is non-responsive, the system may determine that the region of touchscreen 100 that corresponds to the "H" key is non-responsive. The system may modify displayed keyboard 110 by position the "H" key outside of the non-responsive region. In the illustrative example of FIG. 1, only the "H" key is re-positioned, however, the system may perform any suitable modification to displayed keyboard 110 to avoid the non-responsive region of touchscreen 100. The description of FIG. 2 provides further illustrative examples of modified displayed keyboards.

In an illustrative example, in the context of FIG. 1, the user device includes control circuitry configured to monitoring usage behavior (e.g., including typed text 120) of original displayed keyboard 110. The control circuitry is further configured to determine the non-responsive region of touchscreen 100 by identifying misspelled words, all having a missing "H." The control circuitry is further configured to modify displayed keyboard 110 by moving the displayed "H" key to avoid the non-responsive region of touchscreen 100. The control circuitry may perform the aforementioned process based on instructions stored in a non-transitory computer readable medium, for example. In an illustrative example, the instructions include instructions to monitor typed text in the "NOTES" application (e.g., as an add-in to the application) displayed on touchscreen 100, to detect for consistent misspellings or other suitable indicators of a non-responsive region of touchscreen 100.

Figure 2:
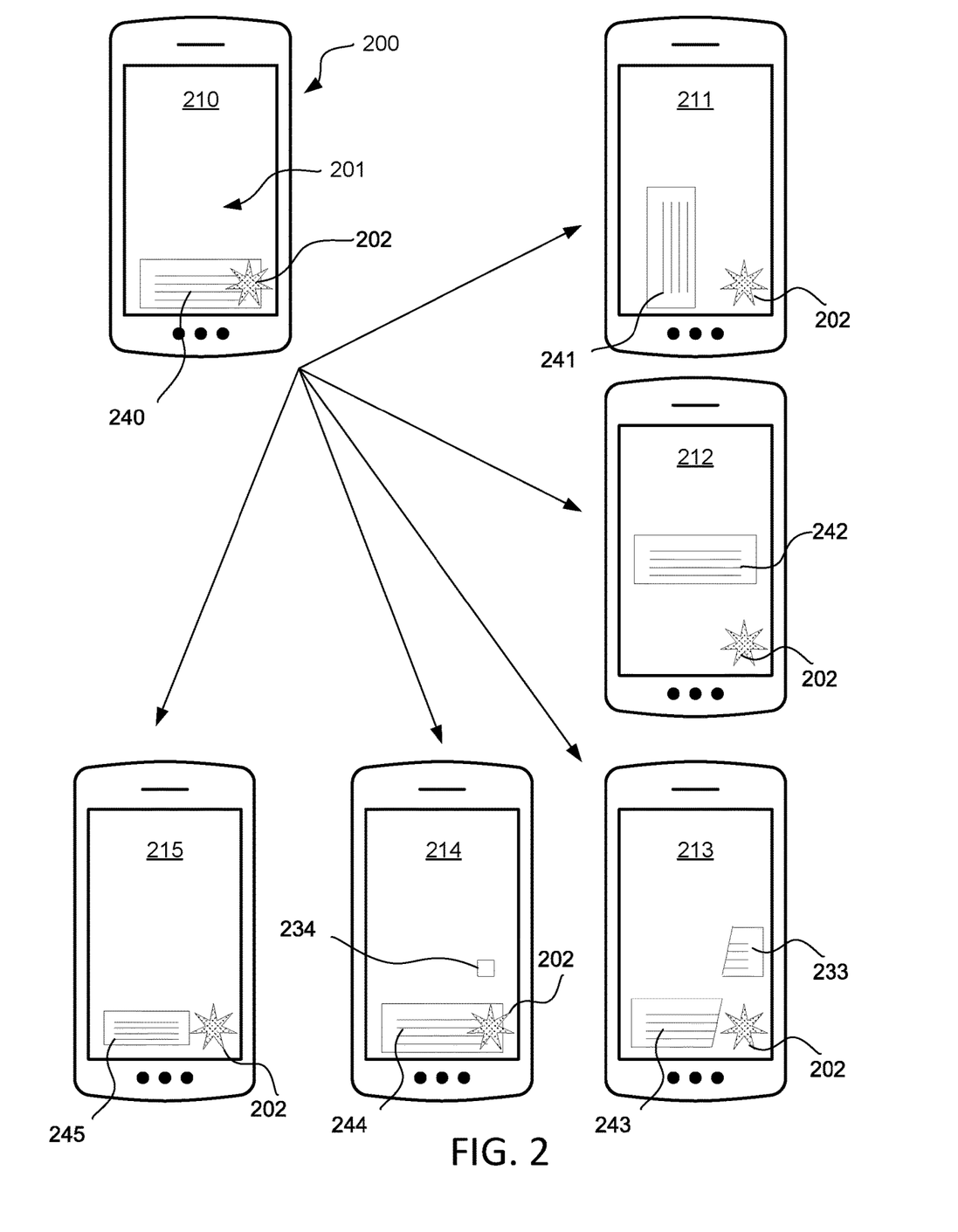
FIG. 2 shows several illustrative examples of a modified displayed keyboard, in accordance with some embodiments of the present disclosure.

FIG. 2 shows several illustrative examples of a modified displayed keyboard, in accordance with some embodiments of the present disclosure. Device 200 includes touchscreen 201, having original display 210. Display 210 includes displayed keyboard 240. Non-responsive region 202, which may have resulted from damage, for example, has a location overlapping with keyboard 240. Device 200 may, in response to detecting non-responsive region 202, modify display 210 to any of displays 211-215, illustrated in FIG. 2.

In some embodiments, device 200 modifies the orientation of keyboard 240 to that of keyboard 241 of display 211.

In some embodiments, device 200 modifies the position of keyboard 240 to that of keyboard 242 of display 212.

In some embodiments, device 200 modifies the position of a portion of keyboard 240 as shown in display 213. Keyboard portions 243 and 233 have different relative positions in display 213 as compared to display 210.

In some embodiments, device 200 modifies the position of a keyboard character of keyboard 240 as shown in display 214. Keyboard character 234 is positioned to avoid non-responsive region 202, while the rest of keyboard 244 remains in the same position as keyboard 240 of display 210.

In some embodiments, device 200 modifies the size of keyboard 240 to that of keyboard 245 of display 215. For example, as illustrated, device 200 reduced the size, and central position, of keyboard 240 to that of keyboard 245 to avoid non-responsive region 202.

Figure 3:
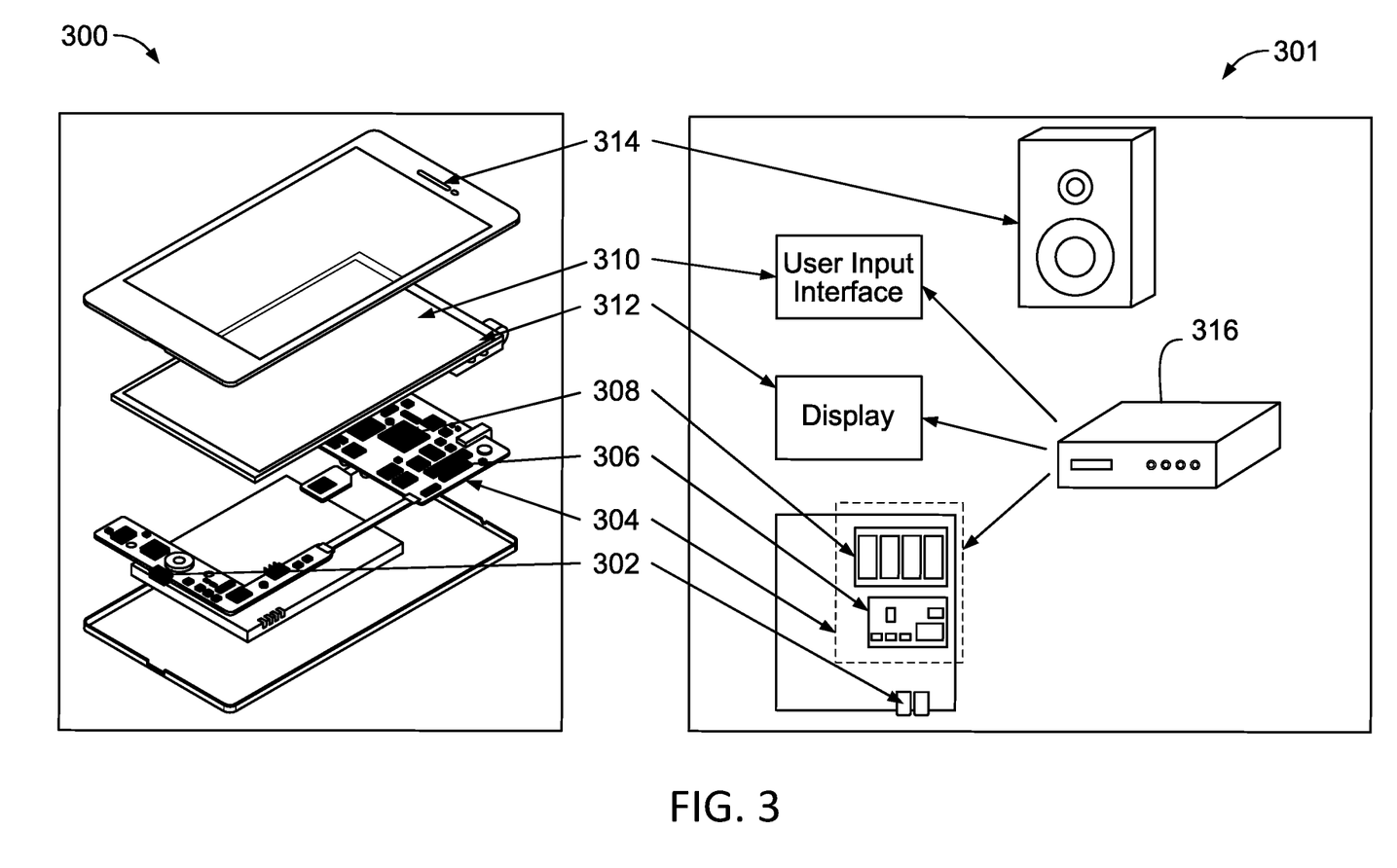
FIG. 3 is a block diagram of an illustrative user equipment, in accordance with some embodiments of the present disclosure.

A user may access content, an application, and other features from one or more of their devices (i.e., user equipment). FIG. 3 shows generalized embodiments of an illustrative user device. For example, touchscreen 100 of FIG. 1, or touchscreen 210 of FIG. 2, may be included as part of user equipment, which may be a smartphone device, a tablet, or a remote control, such as illustrative user device 300 (e.g., illustrated as a smart phone). In a further example, touchscreen 100 of FIG. 1, or touchscreen 210 of FIG. 2, may be included as part of user equipment, which may be a user equipment system 301. User equipment system 301 may include set-top box 316 that includes, or is communicatively coupled to, display 312, audio equipment 314, and user input interface 310. In some embodiments, display 312 may include a television display or a computer display, having a touchscreen. In some embodiments, user interface input 310 is a remote-control device having a touchscreen. Set-top box 316 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of user equipment device 300 and user equipment system 301 may receive content and data via input/output (hereinafter "I/O") path 302. I/O path 302 may provide content and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In some client-server based embodiments, control circuitry 304 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, for example, may be used to supplement storage 308 or instead of storage 308.

A user may send instructions to control circuitry 304 using user input interface 310. User input interface 310, display 312, or both, include a touchscreen configured to provide a display and receive haptic input. For example, the touchscreen may be configured to receive haptic input from a finger, a stylus, or both. A touchscreen may include an outer cover layer (e.g., a cover glass configured to provide mechanical robustness) configured to receive haptic input (e.g., contact pressure) and protect the device and a panel configured to convert the haptic input to electrical signals to control circuitry. The touchscreen may include, for example, a capacitive touchscreen panel (e.g., of the surface or projected type), a resistive touchscreen panel, an infrared touchscreen panel, a surface acoustic wave touchscreen panel, any other suitable panel type, or any combination thereof. The touchscreen panel may include electrodes, an array of electrodes, any other suitable electrical features configured to sense an electrical property that may change with haptic input, or any combination thereof to generate electrical signals indicative of a position on the screen. A touchscreen may have several associated failure modes. A typical failure mode is damage, wherein electrical continuity among electrodes is broken and/or shorted, thus resulting in a non-responsive region. Damage can occur from excessive contact pressure (e.g., typically "cracking" the touchscreen locally), dropping (e.g., the impact from dropping against the ground can crack or otherwise damage the screen). In some circumstance, the damage may be limited to the edge or periphery of the touchscreen. In some circumstance, the damage may be centrally located on the screen, or may include a stripe or other shape of skewed aspect ratio (e.g., much longer in one spatial dimension than another spatial dimension). Damage, or unresponsive region, as used herein, refers to regions of a touchscreen that do not produce a desired or recognizable indication of haptic input. The present disclosure may be applied to any suitable touchscreen of any suitable device, exhibiting any suitable damage that a displayed keyboard may be reconfigured to avoid. In some embodiments, equipment device 300 may include a front facing screen and a rear facing screen, multiple front screens, or multiple angled screens.

Audio equipment 314 may be provided as integrated with other elements of each one of user device 300 and user equipment system 301 or may be stand-alone units. The audio component of videos and other content displayed on display 312 may be played through speakers of audio equipment 314. In some embodiments, the audio may be distributed to a receiver (not shown), which processes and outputs the audio via speakers of audio equipment 314. In some embodiments, for example, control circuitry 304 is configured to provide audio cues to a user, or other audio feedback to a user, using speakers of audio equipment 314. Audio equipment 314 may include a microphone configured to receive audio input such as voice commands or speech. For example, a user may speak letters or words that are received by the microphone and converted to text by control circuitry 304. In a further example, a user may voice commands that are received by the microphone and recognized by control circuitry 304.

An application for managing a displayed keyboard may be implemented using any suitable architecture. For example, a stand-alone application may be wholly-implemented on each one of user device 300 and user equipment system 301. In some such embodiments, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected. An application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the application is a client-server based application. Data for use by a thick or thin client implemented on each one of user device 300 and user equipment system 301 is retrieved on-demand by issuing requests to a server remote to each one of user equipment device 300 and user equipment system 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user device 300. This way, the processing of the instructions is performed remotely by the server while the resulting displays (e.g., that may include text, a keyboard, or other visuals) are provided locally on user device 300. User device 300 may receive inputs from the user via input interface 310 and transmit those inputs to the remote server for processing and generating the corresponding displays. For example, user device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to user device 300 for presentation to the user.

In some embodiments, the application is downloaded and interpreted or otherwise run by an interpreter or virtual machine (e.g., run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the application may be defined by a series of JAVA-based files that are received and run by a local virtual machine or other suitable middleware executed by control circuitry 304.

In some embodiments, the application includes an add-in, toolbox, or feature configured to run with another application (e.g., a host application). Accordingly, the application may include instructions unique to, or otherwise suitable for, the host application. In some embodiments, the application provides information to, or otherwise communicates with, an operating system of a device. For example, the operating system may generate and modify a touchscreen display based on information received from the application.

Figure 4:
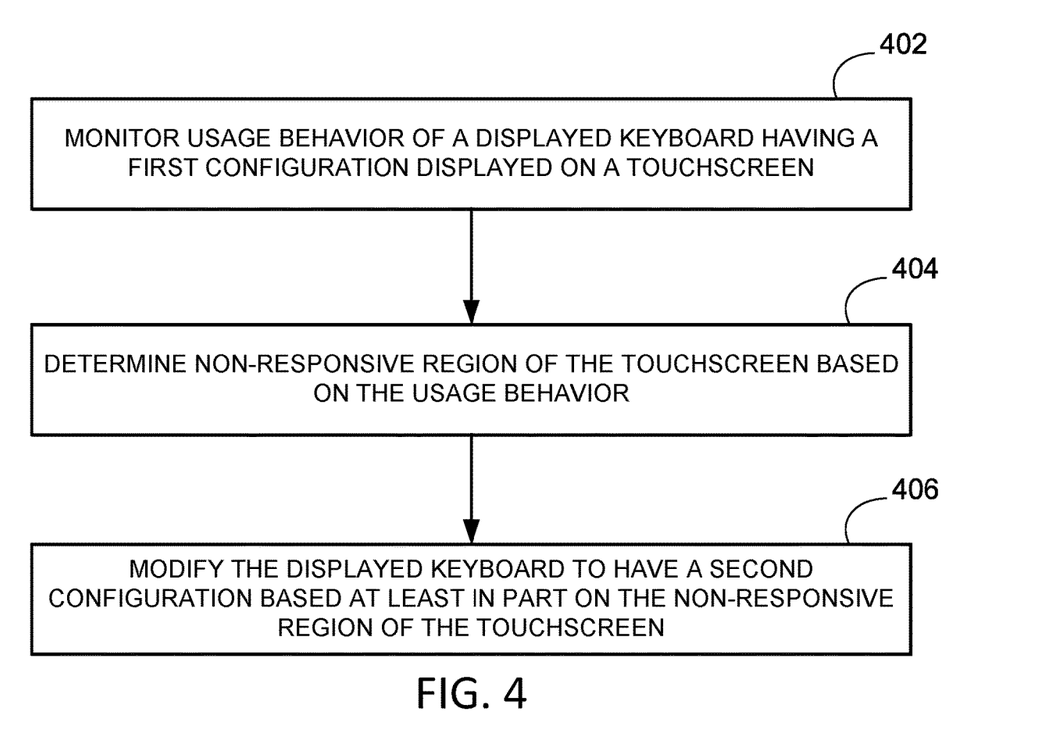
FIG. 4 shows a flowchart of an illustrative process for managing a displayed keyboard on a touchscreen, in accordance with some embodiments of the present disclosure.

FIG. 4 shows a flowchart of illustrative process 400 for managing a displayed keyboard on a touchscreen, in accordance with some embodiments of the present disclosure. Any of the illustrative devices described in the context of FIG. 3, or any suitable control circuitry, may perform steps of illustrative process 400.

Step 402 includes monitoring usage behavior of a displayed keyboard having a first configuration displayed on a touchscreen. The first configuration may have an associated position, size, shape, orientation, and layout, giving the keyboard a first appearance. The control circuitry may, for example, monitor any suitable aspect of haptic input to the displayed keyboard. Usage behavior includes, for example, keystrokes, patterns of keystrokes, spelling and grammar, combined usage behavior (e.g., haptic input along with voice input), any other suitable usage behavior that might indicated a non-responsive region, or any combination thereof. In some embodiments, step 402 includes storing gathered data including usage behavior to analyze statistically. For example, more use of a touchscreen may correspond to more collected data, which may allow for more accurate and effective monitoring. In some embodiments, the device constantly monitors usage behavior for indicators of a non-responsive region. In some embodiments, the device intermittently monitors usage behavior. For example, the device may collect data, and when a sufficient amount of data is collected (e.g., a number of keystrokes, a number of words, a number of misspellings), may then (e.g., at step 404) analyze the data to determine if a region of the touchscreen is non-responsive.

Step 404 includes determining a non-responsive region of the touchscreen based on the usage behavior of step 402. For example, the control circuitry may determine a spatial area (e.g., of any suitable shape and size), a grouping of pixels (e.g., a two-dimensional array of pixels), a central location (e.g., deemed to be about the center of, or otherwise representative of, the region), a boundary (e.g., the outline of a closed spatial area), any other suitable identifying information that defines the non-responsive region, or any combination thereof. In some embodiments, the control circuitry prompts the user to provide haptic input, and based on the input, determines the non-responsive region.

Step 406 includes modifying the displayed keyboard to have a second configuration based at least in part on the non-responsive region of the touchscreen. In some embodiments, the control circuitry modifies the displayed keyboard by changing an associated position, size, orientation, layout, or a combination thereof (e.g., which may change the appearance of the keyboard). In some embodiments, the control circuitry modifies the displayed keyboard based on one or more properties of the non-responsive region. For example, the control circuitry may apply a modification depending upon the position, size, shape, responsiveness (e.g., completely or partially non-responsive) of the non-responsive region), or a combination thereof. In some embodiments, the control circuitry applies more than one type of modification. For example, the control circuitry may move and shrink the displayed keyboard to avoid the non-responsive region. In a further example, the control circuitry may partition the display keyboard into portions and move only one portion of the keyboard.

Figure 5:
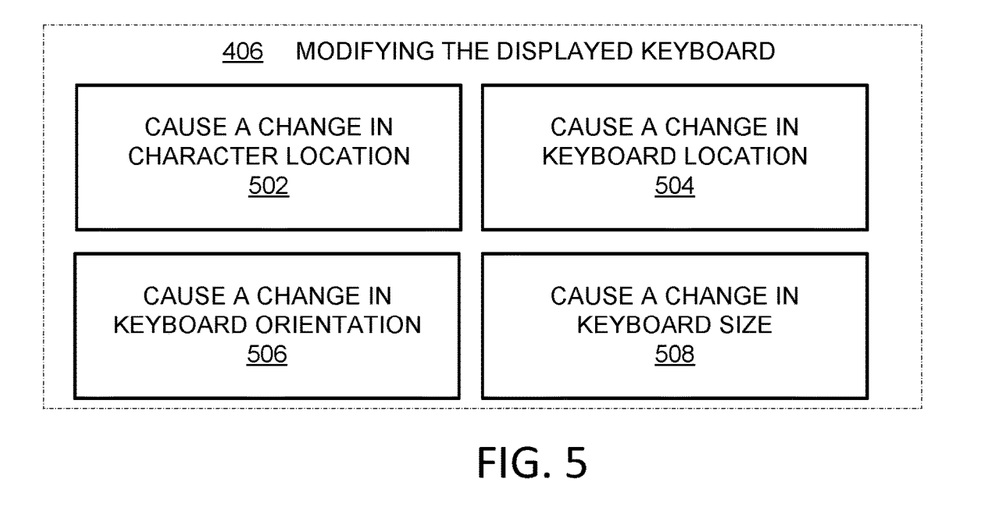
FIG. 5 shows illustrative processes for modifying a displayed keyboard on a touchscreen, in accordance with some embodiments of the present disclosure.

Modifying a displayed keyboard may include one or more techniques to avoid the non-responsive region. The techniques may include, for example, moving, rotating, shrinking, separating, or otherwise altering the displayed keyboard. FIG. 5 shows illustrative processes 502, 504, 506, and 508 for modifying a displayed keyboard on a touchscreen (i.e., step 406 of FIG. 4), in accordance with some embodiments of the present disclosure. Any of the illustrative processes of FIG. 5 may be combined to result in a modified displayed keyboard.

Process 502 includes causing a change in one or more keyboard characters' location on a touchscreen. In some embodiments, characters of the keyboard associated with a responsive region of the touchscreen are maintained in their original location, while characters of the keyboard associated with a non-responsive region of the touchscreen are moved from their original location to the responsive region of the touchscreen. Accordingly, the modified displayed keyboard may differ from the originally-displayed keyboard. In some embodiments, process 502 includes changing the layout of the displayed keyboard. For example, an originally-displayed QWERTY-type keyboard may be modified to avoid the non-responsive region and need not resemble a QWERTY-type keyboard after modification.

Process 504 includes causing a change in a location of a displayed keyboard on a touchscreen. In some embodiments, the displayed keyboard is moved from an original location (i.e., a first configuration) to a responsive region of the touchscreen (i.e., a second configuration). Accordingly, the modified displayed keyboard need not differ from the originally-displayed keyboard in its appearance (i.e., other than its location). In some embodiments, process 502 includes maintaining the layout of the displayed keyboard. For example, an originally-displayed QWERTY-type keyboard may be modified to avoid the non-responsive region and still resemble a QWERTY-type keyboard after modification.

Process 506 includes causing a change in an orientation of a displayed keyboard on a touchscreen. In some embodiments, the control circuitry rotates the displayed keyboard to change a displayed aspect ratio to avoid the non-responsive region. For example, the control circuitry may change an aspect ratio of a displayed keyboard from 1:2 to 2:1 by rotating the displayed keyboard by 90 degrees. The control circuitry may rotate the displayed keyboard by any suitable angle. In some embodiments, the control circuitry rotates and translates the displayed keyboard (e.g., changes the location of the point of rotation of the keyboard) to avoid the non-responsive region of the touchscreen.

Process 508 includes causing a change in a size of a displayed keyboard on a touchscreen. In some embodiments, the over size of the displayed keyboard is reduced, while maintaining the displayed aspect ratio and proportionalities. In some embodiments, only a portion of a displayed keyboard is reduced in size (e.g., the portion corresponding to the non-responsive region). In some embodiments, a displayed keyboard is enlarged such that the non-responsive region affects less of the displayed keyboard characters, rather than completely avoiding the non-responsive region. In some embodiments, the control circuitry causes a change in the size of the displayed keyboard, but maintain a center point (e.g., an anchor point) of the keyboard to reduce spatial translation of the keyboard. In some embodiments, the control circuitry causes a change in the size of the displayed keyboard but maintain an edge or corner point of the keyboard to maintain a displayed border. In some embodiments, the control circuitry may cause a change in size of the displayed keyboard, and also move the keyboard to a new location, rotate the keyboard to a new orientation, or both.

Figure 6:
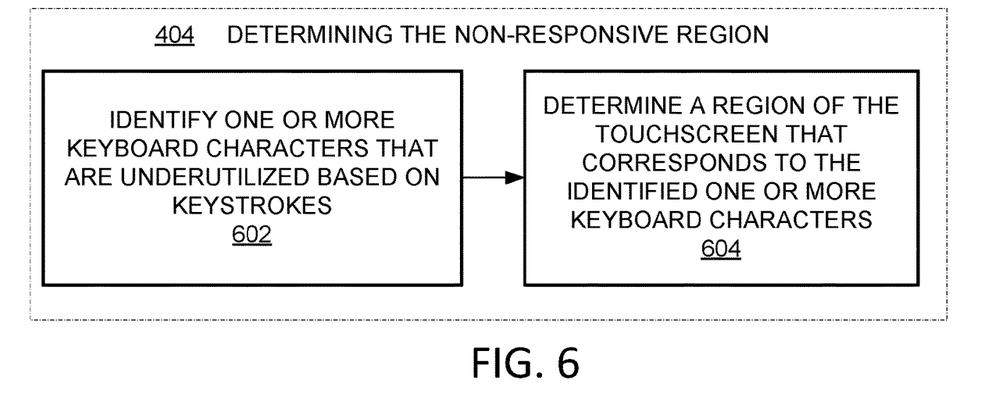
FIG. 6 shows illustrative processes for determining a non-responsive region, in accordance with some embodiments of the present disclosure.

FIG. 6 shows a flowchart of an illustrative process for determining a non-responsive region (e.g., step 404 of FIG. 4), in accordance with some embodiments of the present disclosure. Step 602 includes identifying one or more keyboard characters that are under-utilized based on keystrokes. In some embodiments, the control circuitry stores statistics information indicative of expected keystroke frequencies for each character. By comparing the actual keystrokes to the expected frequency data, characters that are used relatively less than expected may be flagged as corresponding to a non-responsive region. Under-utilization may include un-utilized characters, which are expected to be used. Step 604 includes determining a region of the touchscreen that corresponds to the identified one or more keyboard characters of step 602. In some embodiments, the control circuitry determines a pixel region, a spatial region, or both, that corresponds to the one or more under-utilized keyboard characters. For example, the control circuitry may communicate with the operating system to determine display information to define the non-responsive region.

Figure 7:
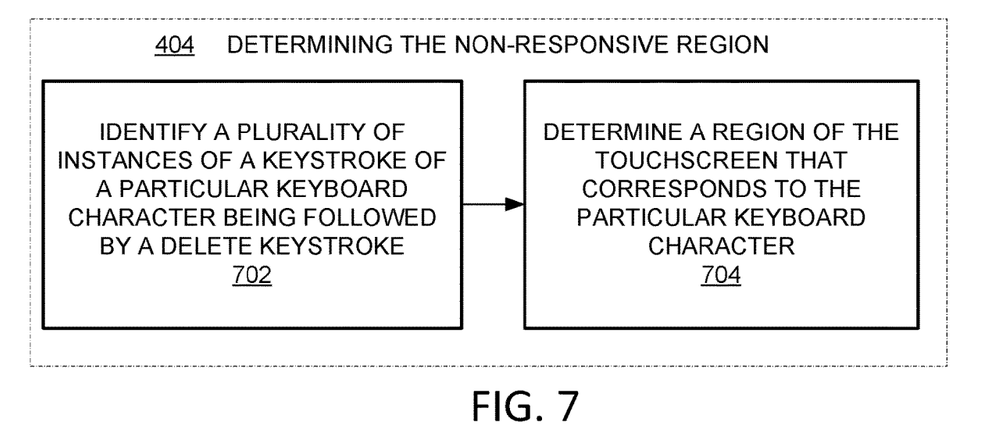
FIG. 7 shows illustrative processes for determining a non-responsive region, in accordance with some embodiments of the present disclosure.

FIG. 7 shows a flowchart of an illustrative process for determining a non-responsive region (e.g., step 404 of FIG. 4), in accordance with some embodiments of the present disclosure. Step 702 includes identifying a plurality of instances of a keystroke of a particular keyboard character being followed by a "delete" keystroke. The "delete" keystroke arises from the erroneous recognition of the characters adjacent or near to the problematic region. The pattern of repeated "delete" keystrokes following the one or more characters provides an indication that a keyboard character corresponds to an insensitive (i.e., non-responsive, or partially responsive) touch surface. A "delete" keystroke incudes keystrokes corresponding to a "delete" key, a "backspace" key, or both. Step 704 includes determining a region of the touchscreen that corresponds to the particular keyboard character of step 702. In some embodiments, the control circuitry determines a pixel region, a spatial region, or both, that corresponds to the particular keyboard character. For example, the control circuitry may cause the operating system to determine display information to define the non-responsive region.

Figure 8:
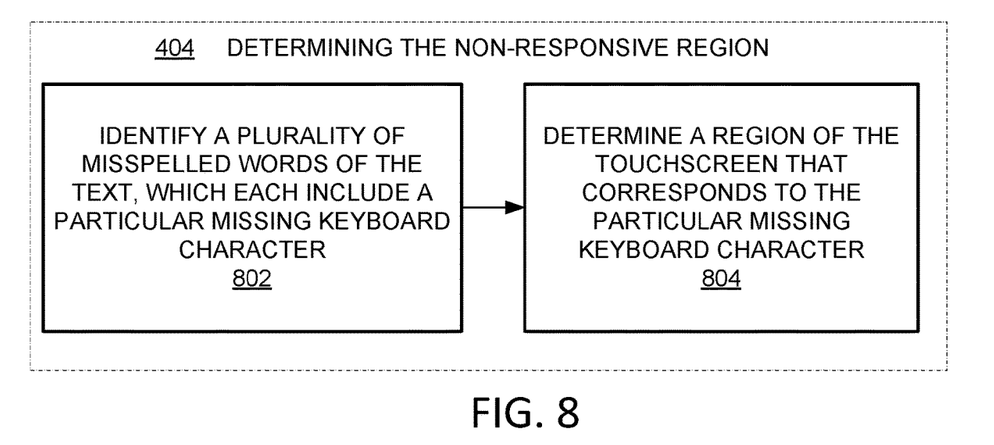
FIG. 8 shows illustrative processes for determining a non-responsive region, in accordance with some embodiments of the present disclosure.

FIG. 8 shows a flowchart of an illustrative process for determining a non-responsive region (e.g., step 404 of FIG. 4), in accordance with some embodiments of the present disclosure. Step 802 includes identifying a plurality of misspelled words of typed text, which each include a particular missing keyboard character. For example, the control circuitry may perform spell checking on inputted text, analyzing the text for words that are not recognized or unexpected based on grammar (e.g., likely misspelled). Step 804 includes determining a region of the touchscreen that corresponds to the particular missing keyboard character of step 802. In some embodiments, the control circuitry determines a pixel region, a spatial region, or both, that corresponds to the particular missing keyboard characters. For example, the control circuitry may communicate with the operating system to determine display information to define the non-responsive region.

Figure 9:
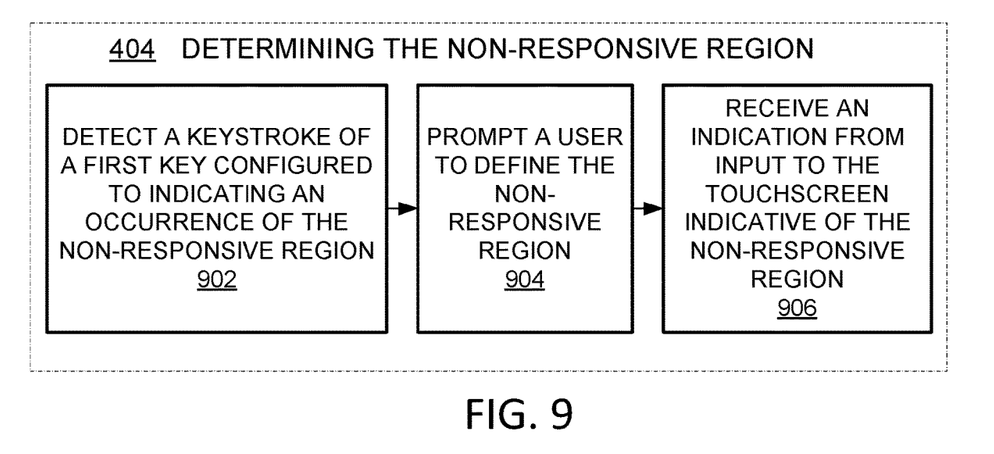
FIG. 9 shows illustrative processes for determining a non-responsive region, in accordance with some embodiments of the present disclosure.

FIG. 9 shows a flowchart of an illustrative process for determining a non-responsive region (e.g., step 404 of FIG. 4), in accordance with some embodiments of the present disclosure. Step 902 includes the control circuitry detecting a keystroke of a first key configured to indicate an occurrence of the non-responsive region of the touchscreen. For example, the display may include a selectable icon, button, menu, or other feature that, when selected, indicates to the control circuitry that a non-responsive region exists. In a further example, the first key may be configured to be selected by a user explicitly for indicating damage to the touchscreen. Step 904 includes the control circuitry prompting a user to define the non-responsive region. Step 906 includes the control circuitry receiving an indication from input to the touchscreen, indicative of the non-responsive region. For example, in response to performing step 904, the control circuitry provides a prompt to the user to provide further information regarding the non-responsive region. In some embodiments, the prompt includes a prompt to use haptic input to define the non-responsive region (e.g., prompt the user to "draw" the non-responsive region). In some embodiments, the prompt includes a plurality of prompt for the user to provide haptic input to different locations on the touchscreen to determine which inputs are recognized (e.g., responsive areas) or not recognized (e.g., non-responsive areas). In some embodiments, the control circuitry may prompt the user for screen input captures, and accordingly enter a special mode to determine and apply a workaround to avoid or otherwise reduce the impact of the non-responsive region.

Figure 10:
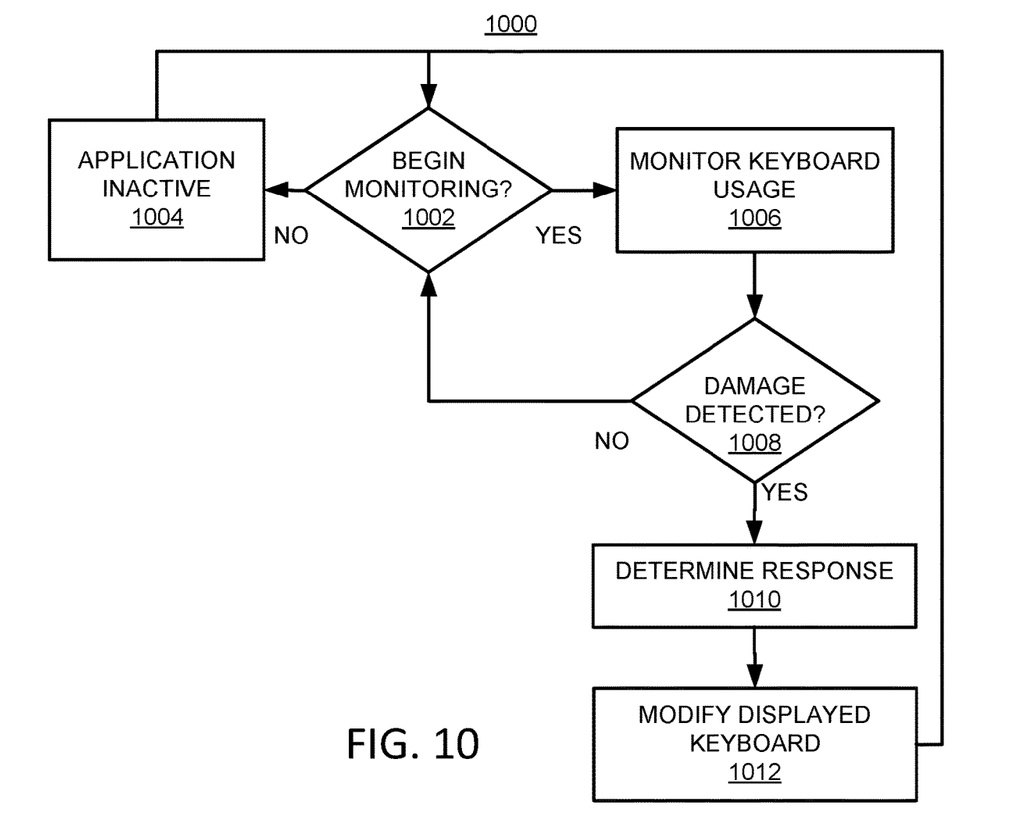
FIG. 10 shows a flowchart of an illustrative process for monitoring a displayed keyboard on a touchscreen for damage, and modifying the displayed keyboard, in accordance with some embodiments of the present disclosure.

FIG. 10 shows a flowchart of illustrative process 1000 for monitoring a displayed keyboard on a touchscreen for damage, and modifying the displayed keyboard, in accordance with some embodiments of the present disclosure.

Step 1002 includes control circuitry determining to begin to monitor usage behavior of a touchscreen. Step 1004 includes the control circuitry performing normal operation, for example, without monitoring for a damaged touchscreen. Step 1006 includes the control circuitry monitoring keyboard usage. The control circuitry may, for example, monitor any suitable aspect of haptic input to the displayed keyboard. Step 1008 includes the control circuitry determining whether an indication of a non-responsive region is detected. If not, the control circuitry may return to step 1002 and determine whether to keep monitoring usage behavior. This determination may be based on a result of step 1008 (e.g., no touchscreen damage detected), a time limit (e.g., monitor usage for a predetermined period of time), usage of the user device (e.g., only monitor usage when the user device is active and being used), any other suitable criterion, or any combination thereof. Step 1010 includes the control circuitry determining a response to a detection of a non-responsive region at step 1008. Step 1012 includes the control circuitry modifying the displayed keyboard to avoid the non-responsive region. In some embodiments, the control circuitry may determine the response at step 1010, and apply the response at step 1012, based on properties of the non-responsive region (e.g., the location, size, or shape of the region). For example, if the non-responsive region is near to an edge of the touchscreen, the control circuitry may shrink the displayed keyboard slightly, rather than change the entire orientation. In a further example, if the non-responsive region is a narrow stripe across the touchscreen, the control circuitry may move the location of the displayed keyboard to avoid the region, rather than change the size or orientation. In a further example, if the non-responsive region is a relatively small region corresponding to only a single keyboard character, the control circuitry may move the location of the character only to avoid the region, rather than change the rest of the keyboard.

In an illustrative example, if the control circuitry determines not to begin monitoring usage behavior at step 1002, the control circuitry may proceed to step 1004. In some embodiments, the control circuitry proceeds from step 1004 to repeat step 1002, until the control circuitry determines to begin monitoring usage behavior. In some embodiments, the control circuitry stores usage behavior, or information derived thereof, for monitoring at a later time. For example, as a user types text using the touchscreen, in the context of one or more applications of the user device, the control circuitry may store keystroke information (e.g., key usage statistics, keystroke patterns), misspelling information (e.g., storing instances of missing letters), any other suitable information, or any combination thereof. When the control circuitry determines to start monitoring usage behavior at step 1002, the control circuitry may recall the stored information from a previous time to detect indications of damage. In some embodiments, the control circuitry only considers information gathered after beginning monitoring usage behavior. The control circuitry may use any suitable combination of historical and real-time data to detect a non-responsive region of the touchscreen.

In a further example, an application implemented by control circuitry may "wake up" whenever a keyboard is displayed on the touchscreen. The application monitors for, for example, text entry stalled for a given threshold time period, a user pressing delete often for a given position of text entry, a user using voice to input specific characters (e.g., rather than haptic input), a user pressing a special key in the keyboard layout to notify the application of problems, or a combination thereof. The application may apply one or more of the aforementioned techniques to determine one or more keyboard characters impacted by the insensitive area of the touchscreen surface. The application may can dynamically determine one more responses to provide a workaround. For example, the application may switch to a modified keyboard character location mode, in which the keyboard characters' positions are changed (e.g., the application specifies a new location of the problematic character(s) to responsive regions). In a further example, the application may apply a change in orientation of the display, or displayed keyboard thereof, by rotating 90 degrees or 180 degrees. To illustrate, the application may implement a frame buffer switch of 180 degrees so that the keyboard layout is in a opposite position as compared to the original configuration. In a further example, the application may provide one or more suggestions for automatic entry or correction (e.g., based on detection rules) for user to accept or reject. In a further example, the application may notify an operating system to restrict display in the non-responsive area for one or more other applications. In a further example, the application may provide a means to the user to identify the problematic area by having the user select the area having the problem. To illustrate, this may be achieved by having the user touch around the areas that exhibit the problem, thus defining a boundary of the region. A non-responsive area may be deemed unavailable (e.g., by the application or operating system) to user interface displays that accept input from the user. To illustrate, the operating system may provide an alternate placement for text input options that overlap the problematic areas. For example, the operating system may identify responsive regions of the screen where the input options may be positioned. In a further example, the operating system may determine to re-calibrate the problematic area. To illustrate, if the re-calibration corrects the problem, the operating system may use different calibration thresholds for the problematic area as opposed to the responsive area.

Figure 11:
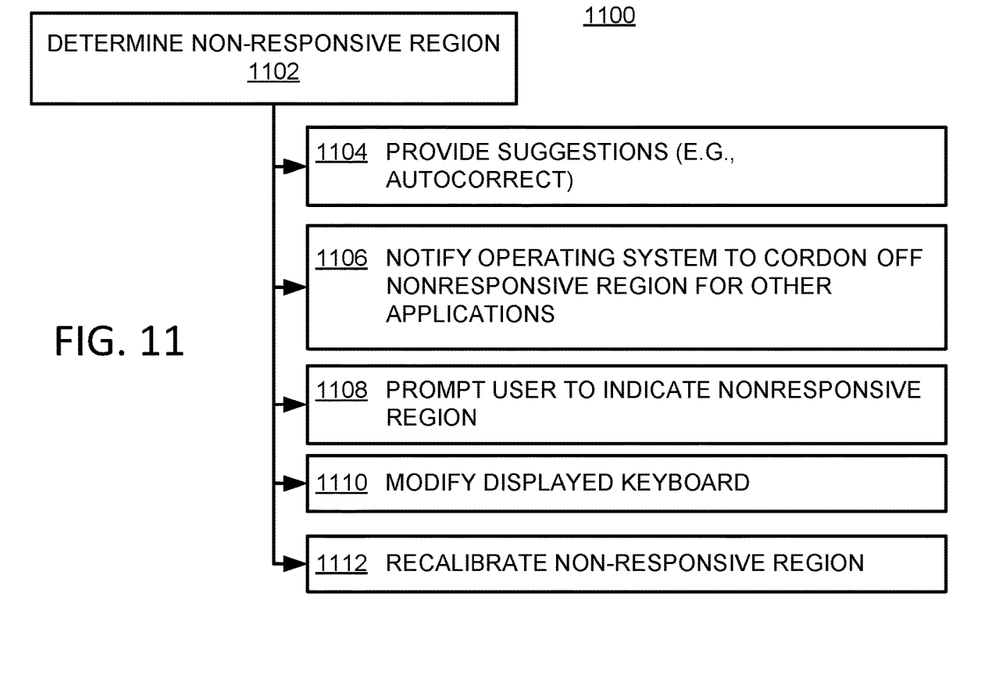
FIG. 11 shows a flowchart of an illustrative process for responding to a determination of a non-responsive region, in accordance with some embodiments of the present disclosure.

FIG. 11 shows a flowchart of illustrative process 1100 for responding to a determination of a non-responsive region, in accordance with some embodiments of the present disclosure. Step 1102 includes the control circuitry determining a non-responsive region, similar to step 402 of FIG. 4. Upon the determination of step 1102, the control circuitry then proceeds to at least one of steps 1104, 1106, 1108, 1110, and 1112.

Step 1104 includes the control circuitry providing one or more suggestions or recommendations to a user (e.g., using the touchscreen display). In some embodiments, the control circuitry need not modify the displayed keyboard, but rather may suggest an autocorrection to address the non-responsive region. For example, the control circuitry may determine that the region corresponding to the key "H" is non-responsive (e.g., similar to the example of FIG. 1), and accordingly may suggest that misspellings involving a missing "H" be automatically corrected. In a further example, the control circuitry may provide selectable options to a user to select the response (e.g., including no response, and leaving the keyboard as is).

Step 1106 includes the control circuitry notifying an operating system to cordon off the non-responsive region for one or more applications. In some embodiments, the display for the touchscreen is generated by, or otherwise managed by, the operating system. Accordingly, the control circuitry may specify information regarding the non-responsive region (e.g., size, shape, number of pixels, or location) to the operating system, which may in response alter the generated display (e.g., including a displayed keyboard). For example, a non-responsive region may be located near the bottom edge of a touchscreen, and the operating system may generate a display only for the region above the non-responsive region (e.g., leaving the non-responsive region blank, or otherwise without a display).

Step 1108 includes the control circuitry prompting a user to indicate the non-responsive region. In some embodiments, the control circuitry may determine at step 1102 that a non-responsive region exists on the touchscreen but may prompt the user to further specify or define the region. For example, the control circuitry may prompt the user for haptic input to test regions of the touchscreen, trace out the likely non-responsive region, or otherwise receive user input to more particularly define the non-responsive region. The control circuitry may prompt the user for input to more accurately define the spatial extent of the non-responsive region (e.g., define the boundaries with more resolution), the extent to which the non-responsive region is non-responsive (e.g., some fraction of haptic input to the region is recognized), prompt the user for any other suitable feedback, or any combination thereof.

Step 1110 includes the control circuitry modifying the displayed keyboard, similar to step 406 of FIG. 4, or any of the processes of FIG. 5, for example.

Step 1112 includes the control circuitry recalibrating the non-responsive region to possible regain at least some responsiveness. In some embodiments, the control circuitry may determine haptic input from the touchscreen based on electrical signals from a touchscreen panel. The calibration between the electrical signals and recognized haptic input may be modified or "tuned" to address damage to the touchscreen. For example, the touchscreen may exhibit damage for which a user must apply more pressure for the haptic input to be recognized. The control circuitry may accordingly increase the gain for the electrical signals, or otherwise modify the calibration such that electrical signals that would otherwise not be recognized are recognized as haptic input. In a further example, the control circuitry may increase or decrease the sensitivity of the touchscreen to haptic input. In some embodiments, the control circuitry may alter the relationship between haptic input to spatial locations of the screen and the corresponding character. For example, the control circuitry may widen the spatial area corresponding to a region having reduced responsiveness to increase the likelihood of recognizing the haptic input.

Figure 12:
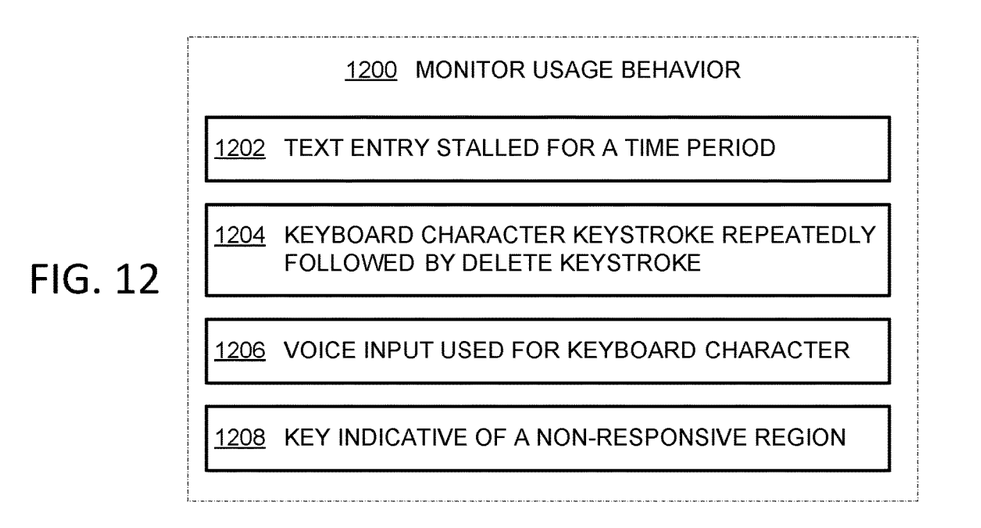
FIG. 12 shows illustrative processes for monitoring a displayed keyboard for indications of damage, in accordance with some embodiments of the present disclosure.

FIG. 12 shows illustrative processes 1200 for monitoring a displayed keyboard for indications of damage (e.g., step 402 of FIG. 4), in accordance with some embodiments of the present disclosure. The control system may monitor usage behavior at step 1202 similar to step 402 of FIG. 4, and perform one or more of steps 1204, 120, 1208, and 1210.

Step 1202 includes the control circuitry monitoring for text entry that is stalled for a time period. In some embodiments, the control system may determine periods of time between recognized haptic input and, if the period is longer than a threshold, determine that a non-responsive region may be present. In some embodiments, the control circuitry determines a time period during which no haptic input to a particular region of the touchscreen is recognized, and accordingly may determine that the particular region is non-responsive.

Step 1204 includes the control circuitry monitoring for repeated instances of a keystroke of a particular keyboard character followed by a "delete" keystroke. In some circumstances, reduced responsiveness or inconsistent responsiveness is an indication of local touchscreen damage. The control circuitry may be configured to recognize keystroke patterns, such as a "delete" or "backspace" keystroke repeatedly following a keystroke corresponding to one or more keyboard characters (e.g., especially if the characters are spatially grouped or otherwise near one another).

Step 1206 includes the control circuitry monitoring for voice input repeatedly used to select a keyboard character rather than haptic input. In some embodiments, a user may notice that the one or more keyboard characters are not recognized via haptic input, and the user may accordingly speak these one or more characters. Accordingly, the control circuitry may recognize that only some characters are indicated using voice-input and the rest are input by haptic interaction.

Step 1208 includes the control circuitry monitoring for selection of a key configured to indicate that a non-responsive region is present. In some embodiments, the touchscreen display includes a selectable icon, button, menu, or other feature that may be selected by a user to indicate that part of the touchscreen is non-responsive. For example, a displayed keyboard may include a selectable icon that, when selected, indicates to the control circuitry to begin monitoring for usage behavior, prompt the user for feedback to determine the non-responsive region, or otherwise manage the displayed keyboard.

It should be noted that any of the illustrative steps and processes of FIGS. 4-12 may be combined, omitted, or otherwise modified, and are not limited to the devices or control components described herein.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for adapting a touchscreen keyboard to address non-responsive regions of the touchscreen, the method comprising:
    monitoring, using control circuitry, usage behavior of a displayed keyboard having a first configuration displayed on a touchscreen;
    determining, using the control circuitry, a non-responsive region of the touchscreen based on the usage behavior by identifying one or more keyboard characters that are under-utilized based on the monitored usage behavior; and
    modifying, using the control circuitry, the displayed keyboard to have a second configuration based at least in part on the non-responsive region of the touchscreen.

2. The method of claim 1, wherein:
    the displayed keyboard comprises a plurality of keyboard characters;
    monitoring the usage behavior comprises monitoring keystrokes of the plurality of keyboard characters of the displayed keyboard;
    determining the non-responsive region of the touchscreen comprises:
        determining a region of the touchscreen that corresponds to the identified one or more keyboard characters; and
    modifying the displayed keyboard to have the second configuration comprises displaying the displayed keyboard such that the one or more identified keyboard characters are positioned outside of the non-responsive region.

3. The method of claim 2, wherein identifying the one or more keyboard characters that are under-utilized based on the keystrokes further comprises identifying a keyboard character that has not been utilized.

4. The method of claim 1, wherein the first configuration comprises a first orientation of the displayed keyboard, wherein the second configuration comprises a second orientation of the displayed keyboard rotated relative to the first orientation, and wherein the displayed keyboard, when displayed in the second configuration, does not overlap the non-responsive region.

5. The method of claim 1, wherein the first configuration comprises a first size of the displayed keyboard and wherein the second configuration comprises a second size of the displayed keyboard rotated reduced relative to the first size, and wherein the displayed keyboard, when displayed in the second configuration, does not overlap the non-responsive region.

6. The method of claim 1, wherein determining the non-responsive region of the touchscreen comprises determining one or more keyboard characters of the displayed keyboard that correspond to the non-responsive region, wherein the first configuration comprises a first location of the one or more keyboard characters, and wherein the second configuration comprises a second location of the one or more keyboard characters, and wherein the second location does not correspond to the non-responsive region.

7. The method of claim 1, wherein determining the non-responsive region of the touchscreen comprises determining a two-dimensional array of pixels that correspond to the non-responsive region.

8. A system comprising:
a touchscreen configured to generate a displayed keyboard;
control circuitry configured to:
monitor usage behavior of the displayed keyboard having a first configuration displayed on the touchscreen;
determine a non-responsive region of the touchscreen based on the usage behavior by identifying one or more keyboard characters that are under-utilized based on the monitored usage behavior; and
modify the displayed keyboard to have a second configuration based at least in part on the non-responsive region of the touchscreen.

9. The system of claim 8, wherein:
the displayed keyboard comprises a plurality of keyboard characters;
when monitoring the usage behavior, the control circuitry is further configured to monitor keystrokes of the plurality of keyboard characters of the displayed keyboard;
when determining the non-responsive region of the touchscreen, the control circuitry is further configured to:
determine a region of the touchscreen that corresponds to the identified one or more keyboard characters; and
when modifying the displayed keyboard to have the second configuration, the control circuitry is further configured to display the displayed keyboard such that the one or more identified keyboard characters are positioned outside of the non-responsive region.

10. The system of claim 9, wherein when identifying the one or more keyboard characters that are under-utilized based on the keystrokes, the control circuitry is further configured to identify a keyboard character that has not been utilized.

11. The system of claim 8, wherein the first configuration comprises a first orientation of the displayed keyboard, wherein the second configuration comprises a second orientation of the displayed keyboard rotated relative to the first orientation, and wherein the displayed keyboard, when displayed in the second configuration, does not overlap the non-responsive region.

12. The system of claim 8, wherein the first configuration comprises a first size of the displayed keyboard and wherein the second configuration comprises a second size of the displayed keyboard rotated reduced relative to the first size, and wherein the displayed keyboard, when displayed in the second configuration, does not overlap the non-responsive region.

13. The system of claim 8, wherein when determining the non-responsive region of the touchscreen, the control circuitry is further configured to determine one or more keyboard characters of the displayed keyboard that correspond to the non-responsive region, wherein the first configuration comprises a first location of the one or more keyboard characters, and wherein the second configuration comprises a second location of the one or more keyboard characters, and wherein the second location does not correspond to the non-responsive region.

14. The system of claim 8, wherein when determining the non-responsive region of the touchscreen, the control circuitry is further configured to determine a two-dimensional array of pixels that correspond to the non-responsive region.

* * * * *